United States Patent Office

3,641,195
Patented Feb. 8, 1972

3,641,195
CURABLE COMPOSITIONS CONTAINING AN EPOXIDE RESIN AND A COPOLYMER OF AN OLEFINE HYDROCARBON WITH AN OLEFINE ESTER
Alan Ball, Duxford, Barry James Hayes, Little Eversden, and Albert John Matthews, Duxford, England, assignors to Ciba Limited, Basel, Switzerland
No Drawing. Filed July 11, 1969, Ser. No. 841,141
Claims priority, application Great Britain, July 18, 1968, 34,397/68
Int. Cl. C08g 45/04
U.S. Cl. 260—837 R
16 Claims

ABSTRACT OF THE DISCLOSURE

This application concerns curable compositions comprising:

(a) an epoxide resin,
(b) dispersed in particulate from in (a), a thermoplastic copolymer of an α-olefine hydrocarbon with an α-olefine which is an ether or is an ester of a carboxylic acid, and
(c) a curing agent for epoxide resins.

The copolymer (b) is preferably an ethylene-vinyl acetate copolymer, and the preferred curing agent is dicyandiamide. The compositions may also contain a latent accelerator, and a second thermoplast, suitably a phenoxy resin or a polysulphone.

Film adhesives prepared from these compositions form bonds with excellent peel strengths.

In an example, film adhesives were employed prepared from bisphenol A polyglycidyl ethers having an epoxide content of 5.7 and 0.25–0.42 equiv./kg., dicyandiamide, imidazole (accelerator), an ethylene-vinyl acetate copolymer, and a phenoxy resin.

---

This invention relates to curable compositions containing an epoxide resin and a thermoplastic copolymer, to the preparation of such compositions, and to their use as adhesives.

Structural adhesive bonding is a well-established procedure in the manufacture of aircraft and in similar industries. Adhesives are used to bond parts of the airframe, and also in constructing lightweight, high-strength sandwich elements which are used as structural parts of the aircraft. These sandwich elements comprise facing panels fixed by adhesive to a cellular honeycomb core made of strips, bonded together, of metal foil or resin-impregnated glass or nylon fibres. Because aircraft are exposed to temperatures as high as 80° C. under tropical conditions, or even higher in supersonic flight, adhesives for structural bonding should retain adequate strength not only at usual atmospheric temperatures but also at considerably higher temperatures.

Adhesives commonly employed for this purpose are based on thermosetting resins such as phenol-formaldehyde resins and epoxide resins, and they often also contain a thermoplastic polymer, such as a poly(vinyl formal) or other poly(vinyl acetal), a nitrile rubber (generally an acrylonitrile-butadiene copolymer), or a "soluble" nylon, i.e. an interpolyamide, soluble in methanol and usually prepared from caprolactam, hexamethylenediammonium adipate, and hexamethylenediammonium sebacate.

In many cases, bonds formed by the adhesive are subjected to repeated flexing or vibrational stress, so these bonds should have high peel strength, that is, be tough and flexible; they should also have high shear strength. Adhesives hitherto available do not in general meet both these requirements.

For example to achieve high peel strength with mixtures of a phenol-formaldehyde resin and a poly(vinyl acetal), a high proportion of the latter has to be used, but then the adhesive strengths at high temperatures are poor, and the compositions flow insufficiently to be entirely satisfactory for bonding facing panels to honeycomb core. With mixtures of phenol-formaldehyde resins and nitrile rubbers, high peel strengths are generally achieved only by sacrificing the otherwise adequate shear strength at high temperatures, and the degree of flow is likewise quite inadequate. Mixtures of epoxide resins with nitrile rubbers often do flow satisfactorily, but again a high peel strength is associated with a low shear strength at elevated temperatures. Epoxide resin-soluble nylon compositions usually give bonds with very high peel strengths, but shear strengths at higher temperatures are only moderate, and the compositions do not flow sufficiently; a further disadvantage is their high sensitivity to water particularly when under load.

It has now been found that certain compositions comprising a curable epoxide resin mixture containing in dispersed form a thermoplastic copolymer yield on curing adhesive bonds having excellent peel and shear strengths.

The present invention accordingly provides curable compositions comprising:

(a) An epoxide resin,
(b) Dispersed in particulate form in (a), a thermoplastic copolymer of an α-olefine hydrocarbon with an α-olefine which is an ester of a carboxylic acid, and
(c) A curing agent for epoxide resins.

Epoxide resins, i.e. substances containing on average more than one 1,2-epoxide group per molecule, which may be employed in these compositions include those containing terminal 1,2-epoxyethyl groups, especially as 1,2-epoxypropyl groups directly attached to an oxygen, nitrogen or sulphur atom.

As examples of such resins may be mentioned polyglycidyl esters obtainable by reaction of a compound containing, per molecule, two or more free carboxyl groups with epichlorohydrin or glycerol dichlorohydrin in the presence of an alkali. Such polyglycidyl esters may be derived from aliphatic polycarboxylic acids, e.g. oxalic acid, succinic acid, glutaric acid, adipic acid, pimelic acid, suberic acid, azelaic acid, sebacic acid, or dimerised or trimerised linoleic acid; from cycloaliphatic polycarboxylic acids such as tetrahydrophthalic acid, 4-methyltetrahydrophthalic acid, hexahydrophthalic acid, and 4-methylhexahydrophthalic acid; and from aromatic polycarboxylic acids such as phthalic acid, isophthalic acid, and terephthalic acid.

Further examples are polyglycidyl ethers obtainable by reaction of a compound containing, per molecule, at least two free alcoholic hydroxyl or phenolic hydroxyl groups with epichlorohydrin or glycerol dichlorohydrin under alkaline conditions or, alternatively, in the presence of an acidic catalyst and subsequent treatment with alkali. These ethers may be derived from acyclic alcohols such as ethylene glycol, diethylene glycol, triethylene glycol, and higher polyoxyethylene glycols, propane-1,2-diol and polyoxypropylene glycols, propane-1,3-diol, butane-1,4-diol, polyoxybutylene glycols, pentane-1,5-diol, hexane-1,6-diol, hexane-2,4,6-triol, glycerol, 1,1,1-trimethylolpropane, pentaerythritol, or poly(epichlorohydrin); from cycloaliphatic alcohols such as resorcitol, quinitol, bis(4-hydroxycyclohexyl) methane, 2,2-bis(4-hydroxycyclohexyl)propane, and 1,1-bis(hydroxymethyl)cyclohex-3 - ene; and from alcohols having aromatic nuclei, such as N,N-bis(2-hydroxyethyl) aniline and p,p′-bis(2-hydroxyethylamino)diphenylmethane. Or they may be derived from mononuclear phenols, such as resorcinol, catechol, and hydroquinone, and polynuclear phenols, such as bis(p-hydroxyphenyl methane, bis(p - hydroxyphenyl)sulphone, 1,1,2,2 - tetrakis(p - hydroxyphenyl)ethane, 2,2 - bis(p-hydroxyphenyl)propane (otherwise known as bisphenol A), 2,2-bis(3,5-dibromo-4-hydroxyphenyl)propane, and novolaks formed from aldehydes such as formaldehyde, acetaldehyde, chloral, or furfuraldehyde, with phenols such as phenol itself, p-chlorophenol, o-cresol, p-cresol, and p-tert. butylphenol.

Poly(N-glycidyl) compounds include, for example, those obtained by dehydrochlorination of the reaction products of epichlorohydrin with amines containing at least two aminohydrogen atoms such as aniline, n-butylamine, bis(p-aminophenyl)methane, or bis(p-methylaminophenyl)methane; triglycidyl isocyanurate; and N,N'-diglycidyl derivatives of cyclic ureas such as ethyleneurea or 1,3-propylene urea and hydantoins such as 5,5-dimethylhydantoin.

Examples of poly(S-glycidyl) compounds are di-S-glycidyl derivatives of dithiols such as ethane-1,2-dithiol and bis(4-mercaptomethylphenyl)ether.

Epoxide resins having terminal 1,2-epoxide groups attached to different kinds of hetero atoms may be employed, e.g. the N,N,O-triglycidyl derivative of p-aminophenol, or glycidyl ether-glycidyl esters of salicylic acid or phenolphthalein.

There may also be used, although they are less preferred, epoxide resins wherein the 1,2-epoxide groups are internal, such as vinylcyclohexene dioxide,
limonene dioxide,
dicyclopentadiene dioxide,
ethylene glycol bis(3,4-epoxydihydrodicyclopentadienyl) ether,
3,4-epoxycyclohexylmethyl 3,4-epoxycyclohexanecarboxylate,
3,4-epoxy-6-methylcyclohexylmethyl 3,4-epoxy-6-methylcyclohexanecarboxylate,
bis(3,4-epoxycyclohexylmethyl)adipate,
bis(3,4-epoxy-6-methylcyclohexylmethyl) adipate,
3-(3,4-epoxycyclohexyl)-2,4-dioxa-9,10-epoxyspiro [5.5] undecane, and
bis(2,3-epoxycyclopentyl) ether.

Epoxide resins containing both terminal and internal epoxide groups may be used, such as 3,4-epoxycyclohexylmethyl glycidyl ether and 2,3-epoxycyclopentyl glycidyl ether.

If desired, a mixture of epoxide resins, or of an epoxide resin with a monoepoxide such as n-butyl, iso-octyl, phenyl, and cresyl glycidyl ethers, or a glycidyl ester of the mixed highly branched, aliphatic, predominantly tertiary monocarboxylic acids available under the designation "Cardura E," may be used.

The preferred epoxide resins are polyglycidyl ethers of polyhydric phenols.

The copolymer (b) is substantially unreactive to the epoxide resin. Its α-olefine hydrocarbon component may be a polyolefine, for example butadiene, but preferably it is a mono-olefine, such as styrene or methylstyrene; further preferred are lower olefines containing not more than 4 carbon atoms, such as ethylene, propene, but-1-ene, or 2-methylpropene, ethylene being particularly preferred.

The α-olefine ester component of copolymer (b) may be a diene, such as an alkenyl ester of an alkenoic acid; usually, mono-olefinic esters are more suitable, such as alkyl esters of alkenoic acids, in particular those consisting only of carbon, hydrogen and ester oxygen atoms, and containing not more than 8 carbon atoms, especially an alkyl acrylate or methacrylate such as ethyl acrylate, n-butyl acrylate or methyl methacrylate. A copolymer of ethylene and ethyl acrylate is available from The Dow Chemical Company under the designation "Zetafin 70." Preferred mono-olefine esters are alkenyl esters of alkanoic acids, particularly those consisting only of carbon, hydrogen and ester oxygen atoms, and containing not more than 8 carbon atoms, especially a vinyl alkanoate such as vinyl formate, vinyl acetate or vinyl propionate.

The copolymer (b) may contain a minor amount, not more than 5% by weight calculated on the α-olefine hydrocarbon and α-olefine ester components, of an α-ethylenically unsaturated carboxylic acid.

Particularly suitable copolymers contain more than 50%, and preferably from 55 to 85%, by weight, of the α-olefine hydrocarbon component. Those most preferred contain 25 to 45% by weight of vinyl acetate units and 75 to 55% by weight of ethylene units. Examples of such are available from E. I. du Pont de Nemours and Co. (Inc.) under the designation "Elvax 40," from Union Carbide Corporation under the designation "Ethylene Copolymer DQD–3269" and from Imperial Chemical Industries Limited.

The proportions of components (a) and (b) can vary widely. Usually, the amount of (b) will be less than that of (a); it will, however, exceed the solubility at room temperature of (b) in (a). In most cases from 2 to 45, especially 4 to 25 parts by weight of the copolymer are employed per 100 parts by weight of the epoxide resin (a).

The curing agent (c) will, in general, be one of the hot-curing agents: typical of these are aromatic polyamines containing at least three amino hydrogen atoms per molecule, such as p-phenylenediamine, m-phenylenediamine, bis(p-aminophenyl)methane and aniline-formaldehyde resins, bis(p-aminophenyl) ether, bis(p - aminophenyl) ketone and bis(p-aminophenyl) sulphone; polycarboxylic acid anhydrides such as maleic anhydride, succinic anhydride, dodecenylsuccinic anhydride, nonenylsuccinic anhydride, polyazelaic anhydride, polysebacic anhydride, phthalic anhydride, tetrahydrophthalic anhydride, methyltetrahydrophthalic anhydride, hexahydrophthalic anhydride, methylhexahydrophthalic anhydride, endomethylene-tetrahydrophthalic anhydride, hexachloroendomethylene-tetrahydrophthalic anhydride, and pyromellitic dianhydride; dicyandiamide, semicarbazide, melamine, N,N-diallymelamine, and polyhydrazides such as isophthalyl dihydrazide, sebacyl dihydrazide, and adipyl dihydrazide. Particularly preferred as curing agent is dicyandiamide, because it is relatively unreactive with the epoxide resin under the conditions employed for blending in the copolymer (b), but causes curing on further heating, forming products distinguished by very high adhesive strengths at elevated temperatures. Sufficient of the curing agent is used to cure the epoxide resin into an insoluble, infusible product. For dicyandiamide, this is usually such as to afford from 0.4 to 1.2 amino-hydrogen equivalents per epoxy equivalent of the epoxide resin. With aromatic polyamines, usually from 0.7 to 1.2 amino - hydrogen equivalents will be used per epoxy equivalent. The amount required to form a cured product with the optimum combination of properties for a particular purpose can readily be found by routine methods familiar to those skilled in the art.

The compositions may also contain an accelerator for the curing reaction. When dicyandiamide is the curing agent, an imidazole, N-benzyldimethylamine, or hexamethylenetetramine may be used as accelerator.

Advantageously the compositions also contain an additional thermoplast which is micible with, but substantially unreactive to, the epoxide resin. Usually, the copolymer (b) is substantially insoluble in this additional thermoplast, but if not, the thermoplast is used in such proportions that some of the copolymer (b) remains undissolved.

A suitable thermoplast is a phenoxy resin, i.e. an essentially linear polyarylene polyhydroxy polyether, which is substantially free from 1,2-epoxide groups, and which has an average molecular weight of at least 10,000. Phenoxy resins are generally copolymers of a dihydric phenol with either a diglycidyl ether of a dihydric phenol or with epichlorohydrin and they contain recurring units of the structure

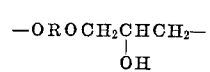

where R denotes the residue of a dihydric phenol after removal of the two phenolic hydroxyl groups. To prepare such resins, a diglycidyl ether of, for example, bis(p-hydroxyphenyl)methane or bisphenol A may be copolymerised with the same phenol or with a different dihydric phenol such as bis(p-hydroxyphenyl) sulphone. Preferably, however, a dihydric phenol, especially bisphenol A, is copolymerised with epichlorohydrin.

Particularly preferred phenoxy resins are of the formula

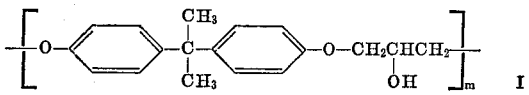
I where $m$ has an average value in the range 40 to 160.

A preferred phenoxy resin is available from Union Carbide Corporation under the designation PRDA-8060; it has the structure indicated by Formula I, $m$ having an average value of approximately 100.

Instead of the phenoxy resin there may be used a polysulphone resin, i.e. an essentially linear polysulphone, which has an average molecular weight of at least 10,000, and which contains a repeating unit of formula

where A denotes a divalent aromatic group which may be interrupted by ether oxygen and/or by divalent aliphatic groups. Especially suitable are polysulphones obtained by reaction of a di-alkali metal salt of a dihydric phenol such as the disodium salt of bisphenol A with a bis-(monochloroaryl) sulphone such as bis(p-chlorophenyl) sulphone.

Particularly preferred polysulphone resins are of the formula

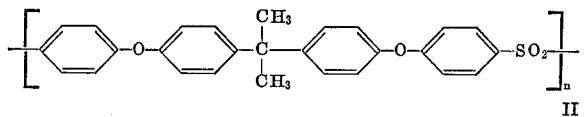
II where $n$ has an average value in the range 50 to 120.

Suitable polysulphone resins are available from Union Carbide Corporation under the designations "Polysulphone P 1700," "Polysulphone P 2300," and "Polysulphone P 3500." These have the structure indicated by Formula II, $n$ being in the range 50 to 80 for the P 1700 grade, in the range 68 and 113 for the P 2300 grade, and in an intermediate range for the P 3500 grade.

Usually from about 1 to 100, especially 10 to 80, parts by weight of the phenoxy resin or the polysulphone resin are employed per 100 parts by weight of the epoxide resin (a).

The compositions of this invention may contain fillers such as glass beads, fibres of asbestos, glass, boron, or carbon, whiskers of alumina, carbon, silicon carbide and silicon nitride, and powdered metals such as aluminium. They may also contain colouring matters, especially pigments such as titanium dioxide; and thixotropic agents, such as finely-divided silica, especially that available under the designation "Aerosil," or amine-modified clays. ("Aerosil" is a registered trademark.)

For use as adhesives, the compositions are conveniently employed as films which may be produced by dispersing the thermoplastic copolymer (b) in the epoxide resin (a), heated to a temperature of at least 50° C. but not above 250° C. and optionally containing the second thermoplast (the phenoxy resin or polysulphone resin), cooling the dispersion to a temperature not higher than 130° C., incorporating the curing agent, and shaping the mixture into a film in a known manner such as by casting or pressing. Normally the epoxide resin will be heated at 140° to 175° C., or even up to 260° C. if such a second thermoplast resin is present, then the mixture is cooled to between 65° and 130° C. and the curing agent, with an accelerator if used, is incorporated. Casting or pressing are usually carried out at about 65° to 130° C. A filler may be incorporated at any stage prior to the shaping operation.

To effect adhesion between two surfaces, a film of the composition is interposed between, and in contact with, the surfaces, and the composition is then cured by further heating, e.g. for 1 to 2 hours at 90° to 200° C.

The film may also be cast onto unidirectional fibers and woven carriers to form adhesive "prepregs."

The following examples illustrate the invention. Parts and percentages, unless otherwise specified, are by weight.

As a measure of the "toughness" or flexibility of the bonds formed with the adhesive compositions were used the "Climbing Drum peel" test and the "T-peel" test, both conventional methods for measuring this quality.

Honeycomb sandwich structures were made by applying a film of the adhesive, 0.25±0.025 mm. thick, to aluminium alloy sheets available under the designation "2L 73 Alclad," 0.46 mm. thick, and bonding these at 120° C. for 1 hour under a pressure of 3.5 kg./sq. cm. to a cellular aluminium core material available under the designation "Aeroweb E 144 BP" ("Aeroweb" is a registered trademark). The alloy sheets had been degreased, pickled as laid down in British Ministry of Aviation Aircraft Process Specification DTD-915B, washed in running water, and dried at room temperature. The sandwich structures were sawn into strips 7.62 cm. wide, and the "Climbing Drum peel" strengths were determined by the Climbing Drum test described in United States Military Specification MIL-A-25463 (ASG) dated Jan. 14, 1958, the peeling torque being measured by means of an Avery Universal Testing machine.

"T-peel" strengths were measured by the procedure described in United States Military Specification MMM-A-132. Sheets of "2024 T3 Alclad," 0.5 mm. thick, were used, and they were sawn into strips 25 mm. wide and 30.5 cm. long, 6.6 cm. of this length being left unbonded.

To determine the tensile shear strengths of the bonds, sheets, 1.63 mm. thick, of "2L 73 Alclad" were first degreased and pickled as before, washed in running water, and dried at room temperature. Panels were then prepared as laid down in United States Military Specification MMM-A-132, with an overlap of 1.3 cm., by applying the adhesive composition in film form 0.25±0.025 mm. thick and curing at 120° C. for 1 hour under a pressure of 3.5 kg./sq. cm. The cured panels were sawn into strips 2.54 cm. wide and pulled apart at the test temperature at 0.63 cm. per minute.

Materials employed in preparing the adhesive compositions were as follows:

"Epoxy resin A" denotes a polyglycidyl ether, prepared in a known manner from bisphenol A and epichlorohydrin in the presence of alkali, and purified by crystallisation. It was semisolid at room temperature and had a 1,2-epoxide content of approximately 5.7 equiv./kg.

"Epoxy resin B" denotes a polyglycidyl ether, prepared in a known manner from bisphenol A and epichlorohydrin in the presence of alkali, followed by advancement. It had a softening point of 145° to 155° C. and a 1,2-epoxide content in the range 0.25 to 0.42 equiv./kg.

"Epoxy resin C" denotes a polyglycidyl ether, prepared in a known manner from resorcinol and epichlorohydrin in the presence of alkali. It had a 1,2-epoxide content of approximately 7.7 equiv./kg.

"Epoxy resin D" denotes a polyglycidyl ether, prepared in a known manner from a polypropylene glycol of average molecular weight 380 and epichlorohydrin in the presence of alkali. It had a 1,2-epoxide content of approximately 5 to 5.2 equiv./kg.

"Epoxy resin E" denotes a polyglycidyl ester, prepared in a known manner from a dimerised long chain aliphatic monocarboxylic acid and epichlorohydrin in the presence of alkali, and having a 1,2-epoxide content of approximately 2.1 to 2.5 equiv./kg.

"Copolymer I" denotes "Elvax 40" of Du Pont, containing 39 to 42% of vinyl acetate units and 58 to 61% of ethylene units. "Copolymer II" denotes "Elvax 250,"

which contains 27 to 29% of vinyl acetate units and 71 to 73% of ethylene units.

"Copolymer III" denotes "Ethylene Copolymer DQD–3269" of Union Carbide Corporation, an ethylene-vinyl acetate copolymer containing 28 to 30% of vinyl acetate units and 70 to 72% of ethylene units.

"Copolymer IV" denotes "Zetafin 70," an ethylene-ethyl acrylate copolymer supplied by The Dow Chemical Company.

"Copolymer V" and "Copolymer VI" denote "Elvax Terpolymer 4260" and "Elvax Terpolymer 4320" Du Pont. The former contains 28% and the latter 25%, of vinyl acetate units, the balance being predominantly ethylene units but including about 1% of a copolymerised unsaturated acid, both copolymers having an acid number of 6.

"Phenoxy resin I" denotes "PRDA–8060" of Union Carbide Corporation, a phenoxy resin having the Formula I in Col. 5 of the specification.

EXAMPLE 1

Film adhesives were prepared from the compositions shown in Table I. To prepare compositions (a), (c), and (d), the epoxy resin (or epoxy resins) and Copolymer I were mixed in a Z-blade mixer for one hour at 170° C., the mixture was cooled to 65° C., the remaining ingredients were mixed in for 20 minutes, and films were cast at 70° C. Compositions (e) and (f) were prepared similarly, the epoxy resin, Phenoxy resin I, and Copolymer I (when used) being heated at 180° C. The adhesives were cured by heating for 1 hour at 120° C. under a pressure of 3.5 kg./sq. cm., except for composition (b) which contained only Copolymer I: a film of this polymer was heated under the same pressure to 185° C. for five minutes only, because no heat-curing reaction was involved.

TABLE I

| Composition | (a) | (b) | (c) | (d) | (e) | (f) | (g) | (h) | (i) |
|---|---|---|---|---|---|---|---|---|---|
| Epoxy resin: | | | | | | | | | |
| A | 100 | | 100 | 100 | 100 | 100 | | 70 | 70 |
| B | | | | 100 | 100 | | | 130 | 120 |
| C | | | | | | | 100 | | |
| D | | | | | | | | 30 | |
| E | | | | | | | | | 30 |
| Copolymer I | X | | 25 | | 25 | | 15 | 28 | 26 |
| Dicyandiamide | 8 | | 8.4 | 8.4 | 8 | 8 | 10.5 | 9.8 | 7.2 |
| Imidazole (accelerator) | 0.5 | | 0.5 | 0.5 | 0.5 | 0.5 | 0.5 | 0.5 | 0.5 |
| Phenoxy resin I | | | | | 60 | 60 | 70 | | |
| "Aerosil" | 5 | | | | | | | | |
| Titanium dioxide | | | | | | | | 2 | 2 |

"Aerosil" was included in composition (a) to prevent excessive flow.

Table II shows the test results: unless otherwise stated, the tests were carried out at 20° C.

TABLE II

| Composition | (a) | (b) | (c) | (d) | (e) | (f) | (g) | (h) | (i) |
|---|---|---|---|---|---|---|---|---|---|
| Tensile shear strength (kg./sq. cm.) | 248 | 68 | 322 | 458 | 326 | 508 | 506 | 540 | 420 |
| At 82° C | 367 | Nil | 470 | 376 | 438 | 481 | | 382 | 319 |
| At 120° C | 237 | | 214 | 133 | 235 | 179 | | | |
| T-peel strength (kg./cm.) | 0.178 | 2.32 | 0.36 | 3.20 | 0.35 | 5.72 | 2.49 | 8.6 | 6.7 |
| Climbing drum peel strength (kg.-cm. per 7.62 cm.-width) | 5.53 | | 25.4 | 52.9 | 23.0 | 38.0 | | | |

The superiority of the compositions of this invention, (d), and (f) to (i), can clearly be seen.

Similar results are obtained if 27 parts of bis(p-aminophenyl)methane are used in place of the dicyandiamide and imidazole.

For purposes of comparison, compositions were prepared (see Table III) which contained an epoxy resin and a thermoplast which was not a copolymer of an α-olefine hydrocarbon and an α-olefine ester.

TABLE III

| Composition | (j) | (k) | (l) |
|---|---|---|---|
| Epoxy resin: | | | |
| A | 100 | 100 | 100 |
| B | 100 | | |
| Polypropylene powder | 25 | | |
| Poly(n-butyl methacrylate) | | 15 | |
| Poly(amino-amide) | | | 15 |
| Dicyandiamide | | 8 | 8 |
| Imidazole | | 0.5 | 0.5 |
| Phenoxy resin I | | 61.3 | 61.3 |

The constituents of composition (j) were mixed for 2 hours at 200° C.: because the powdered polypropylene could not be dispersed uniformly, it was not possible to prepare a satisfactory film adhesive. Composition (k) was prepared and cured as described for compositions (e) and (f): the T-peel strength was only 0.58 kg./cm. Composition (l) was prepared by mixing for 1 hour at 200° C., and cured as described above. This composition, which contained a thermoplastic poly(amino-amide), was very brittle, and the T-peel strength was only 0.58–0.76 kg./cm.

EXAMPLE 2

This example illustrates the use of other copolymers of an α-olefine hydrocarbon and an α-olefine ester. Film adhesives were made from the components shown in Table IV, composition (m) being prepared as described for compositions (e) and (f), and compositions (n) to (q) as described for compositions (a), (c), and (d). The adhesives were cured as before, and the test results obtained are given in Table V.

TABLE IV

| Composition | (m) | (n) | (o) | (p) | (q) |
|---|---|---|---|---|---|
| Epoxy resin: | | | | | |
| A | 100 | 100 | 100 | 100 | 100 |
| B | | 100 | 100 | 100 | 100 |
| Copolymer: | | | | | |
| II | 3.08 | | | | |
| III | | 25 | | | |
| IV | | | 25 | | |
| V | | | | 25 | |
| VI | | | | | 25 |
| Dicyandiamide | 11 | 9.4 | 9.4 | 9.4 | 9.4 |
| Imidazole | | 0.5 | 0.5 | 0.5 | 0.5 |
| Phenoxy resin I | 72.3 | | | | |
| Titanium dioxide | | 2 | 2 | 2 | 2 |
| Aluminium powder | 44 | | | | |

TABLE V

| Composition | (m) | (n) | (o) | (p) | (q) |
|---|---|---|---|---|---|
| Tensile shear strength (kg./sq. cm.) | 578 | 495 | | 500 | 530 |
| At 82° C | 500 | 410 | | 390 | 455 |
| At 120° C | 233 | 172 | | | 246 |
| T-peel strength (kg./cm.) | 1.4 | 3.95 | | 2.7 | 5.4 |
| Climbing drum peel strength (kg.-cm. per 7.62 cm-width) | | 10.3 | 48.3 | 80.5 | 133 |

What is claimed is:
1. A curable composition consisting essentially of:
   (a) an epoxide resin containing on average more than one 1,2-epoxide group per molecule,
   (b) dispersed in particulate form in (a), from 2 to 45 parts by weight per 100 parts of epoxide resin (a) of a thermoplastic copolymer which comprises from about 50% to about 85% by weight of an aliphatic alpha-mono-olefin and correspondingly from about 15% to about 50% by weight of an alkyl ester of an alkenoic acid or alkenyl ester of an alkanoic acid, said ester consisting substantially only of carbon, oxygen and ester oxygen atoms and containing at most 8 carbon atoms, and
   (c) a curing agent for epoxide resins.
2. A composition according to claim 1, wherein the epoxide groups in the epoxide resin (a) are 1,2-epoxypropyl groups directly attached to oxygen or to nitrogen or to sulphur.
3. A composition according to claim 2, wherein the epoxide resin is a polyglycidyl ether of a polyhydric phenol.

4. A composition according to claim 1, wherein the α-olefine component of (b) is a mono-olefine containing at most four carbon atoms.

5. A composition according to claim 4, wherein the mono-olefine is ethylene.

6. A composition according to claim 1, wherein the ester component is an alkyl ester of an alkenoic acid consisting only of carbon, hydrogen, and ester oxygen atoms and containing at most 8 carbon atoms.

7. A composition according to claim 6, wherein the ester component is an alkyl acrylate or an alkyl methacrylate.

8. A composition according to claim 1, wherein the ester component is an alkenyl ester of an alkanoic acid consisting only of carbon, hydrogen and ester oxygen atoms and containing at most 8 carbon atoms.

9. A composition according to claim 8, wherein the ester component is a vinyl alkanoate.

10. A composition according to claim 9, wherein the vinyl alkanoate is vinyl acetate.

11. A composition according to claim 10, wherein the copolymer (b) contains 25 to 45% of vinyl acetate units and 75 to 55% of ethylene units.

12. A composition according to claim 1, wherein the curing agent (c) is dicyandiamide.

13. A composition according to claim 1, containing a thermoplastic, essentially linear polyarylene polyhydroxy polyether which is substantially free from 1,2-epoxide groups and which has an average molecular weight of at least 10,000.

14. A composition according to claim 1, containing a thermoplastic, essentially linear polysulphone which has an average molecular weight of at least 10,000 and which contains a repeating unit of formula

—A—SO$_2$— where A denotes a divalent aromatic group or a divalent aromatic group interrupted by a member selected from the group consisting of ether oxygen and divalent aliphatic group.

15. A composition according to claim 1, containing from 10 to 80 parts by weight of a thermoplastic, essentially linear polyether or polysulphone polymer per 100 parts by weight of the epoxide resin (a).

16. A method of producing in film form a composition as claimed in claim 1, which comprises dispersing the copolymer (b) in the epoxide resin (a) heated to at least 50° C. but not above 250° C., cooling the mixture to not higher than 130° C., incorporating the curing agent (c), and shaping the mixture into a film.

References Cited

UNITED STATES PATENTS

| | | | |
|---|---|---|---|
| 2,884,339 | 4/1959 | Dannenberg | 260—837 |
| 3,227,668 | 1/1966 | Ackermann | 260—28 |
| 3,297,784 | 1/1967 | Snedeker | 260—837 |
| 3,542,902 | 11/1970 | Dunion | 260—836 |
| 3,201,374 | 8/1965 | Simms | 260—837 |
| 3,247,131 | 4/1966 | Bliss | 260—836 |
| 3,392,045 | 7/1968 | Holub | 260—837 |
| 3,397,169 | 8/1968 | Wilkinson | 260—837 |
| 3,487,124 | 12/1969 | Yeshin | 260—836 |

FOREIGN PATENTS

| | | | |
|---|---|---|---|
| 1,343,547 | 10/1963 | France | 260—836 |

PAUL LIEBERMAN, Primary Examiner

U.S. Cl. X.R.

260—37 Ep, 41 A, 41 B, 41 AG, 47 EN, 47 EC, 830 R, 830 TW, 837